United States Patent
Schindler et al.

(10) Patent No.: US 6,945,648 B2
(45) Date of Patent: Sep. 20, 2005

(54) HMD DEVICE

(75) Inventors: Achim Schindler, Oberkochen (DE); Birgit Rottenkolber, Schwäbisch Gmünd (DE)

(73) Assignee: Carl-Zeiss-Stiftung, Heidenheim (DE)

( * ) Notice: Subject to any disclaimer, the term of this patent is extended or adjusted under 35 U.S.C. 154(b) by 17 days.

(21) Appl. No.: 10/802,960

(22) Filed: Mar. 17, 2004

(65) Prior Publication Data

US 2004/0240072 A1 Dec. 2, 2004

(30) Foreign Application Priority Data

Mar. 18, 2003 (DE) .......................... 103 11 972

(51) Int. Cl.[7] .............. G02C 1/00; G02C 1/04
(52) U.S. Cl. ............... 351/158; 351/106; 359/632
(58) Field of Search ............ 351/41, 158, 103–109; 359/630, 632

(56) References Cited

U.S. PATENT DOCUMENTS

| 3,838,914 | A | * | 10/1974 | Fernandez ............. 351/106 |
| 4,398,799 | A | * | 8/1983 | Swift ................... 359/632 |
| 4,751,691 | A | | 6/1988 | Perera |
| 5,151,722 | A | | 9/1992 | Massof et al. |
| 5,880,773 | A | | 3/1999 | Suzuki |
| 6,045,222 | A | | 4/2000 | Oppedisano et al. |

FOREIGN PATENT DOCUMENTS

| GB | 2337681 A | 11/1999 |
| WO | WO 99/23525 A1 | 5/1999 |

* cited by examiner

Primary Examiner—Huy Mai
(74) Attorney, Agent, or Firm—Patterson, Thuente, Skaar & Christensen, P.A.

(57) ABSTRACT

An HMD device is provided, comprising a frame, which is mountable on the head of a user, an image-generating device mounted on said frame and comprising projection optics, a connecting device and glasses for correcting an eye deficiency of the user, said glasses not having sides and said glasses being releasably connectable with said frame by said connecting device, said glasses being arranged following said projection optics when the glasses are connected with the frame.

19 Claims, 1 Drawing Sheet

HMD DEVICE

This application claims priority to German Application No. 10311972.8 filed Mar. 18, 2003. Said application is incorporated by reference herein.

BACKGROUND OF THE INVENTION

The invention relates to an HMD device (Head Mounted Display device).

If an HMD device is to be used by a person wearing glasses, there is usually the requirement to wear said HMD device and said glasses at the same time. In order to be able to guarantee unimpaired vision, the HMD device and the glasses need to be correctly adjusted with respect to each other and relative to the eye.

For this purpose, the HMD device may be mounted on the spectacle frame. If the HMD device is mounted directly on the spectacle frame, this is complicated, on the one hand, because said mounting needs to be carried out differently for each different spectacle frame. On the other hand, stable mounting is difficult to realize.

Alternatively, the HMD device may be connected with the glasses via a fitting provided on the spectacle frame. For this purpose, it is required to effect changes in the spectacle frame itself, in order to mount said fitting.

Said mounting on the spectacle frame has the further disadvantage that the HMD device cannot be carried on the head in a stable manner due to its relatively high weight (compared with that of the glasses). This disadvantage is aggravated, in particular, by the tendency toward lighter and more delicate glasses.

Further, it is possible to wear the HMD device over one's own glasses. However, since the HMD device and the glasses are neither mechanically nor optically adjusted to each other, this will lead to difficulties in wearing them, and viewing of the images generated by the HMD device is possible only in a restricted manner.

It is known from DE 691 32 589 T2 to provide correcting lenses for correction of an eye deficiency within the projection optics of HMD devices comprising a frame to be worn on the head as well as an image-generating device mounted on said frame and comprising projection optics. However, this has the disadvantageous result that the HMD device can only be used by that person whose eye deficiency is corrected by said inserted lenses. Further, it is also complicated, of course, to arrange lenses within the projection optics, and this may easily lead to soiling of the projection optics.

In view thereof, it is an object of the invention to provide an HMD device which may be used both by persons with and without an eye deficiency.

SUMMARY OF THE INVENTION

According to the invention, this object is achieved by an HMD device comprising a frame, which is mountable on the head of a user, an image-generating device mounted on said frame and comprising projection optics, a connecting device and glasses for correcting the user's eye deficiency, said glasses not having temples, said glasses further being releasably connectable with said frame by said connecting device, and said glasses being arranged following said projection optics when the glasses are connected with the frame.

By providing the connecting device by which said releasable connection is realizable and due to the feature that the glasses are arranged following the projection optics when the glasses are connected with the frame, the glasses may be easily connected with the frame, exchanged, or omitted in the first place. This allows the HMD device to be individually adjusted to the respective user in a quick and easy manner.

Since the glasses are provided without temples, they are not worn mainly by the sides of the glasses being supported by the ears, as is usually the case with glasses, but essentially via the frame of the HMD device, so that there is no difficulty in using the HMD device and the glasses at the same time.

The glasses may comprise only one correcting lens for one eye of the user or also one correcting lens each for each eye of the user and, thus, two correcting lenses. Of course, the correcting lens need not be made of glass, but may also be made of plastics or any other suitable material. If the glasses contain two lenses, the latter are preferably connected with each other by a bridge which may be supported on the nose of the user when wearing the HMD device with inserted glasses.

In particular, the connecting device of the HMD device according to the invention may be provided such that it always holds the glasses in the same predetermined position when the glasses are connected with the frame. Thus, the connecting device also realizes the function of an adjusting device, so that there is always an optimal adjustment provided for the user in the connected state of the glasses and the frame, thus guaranteeing unimpaired viewing of the images generated. Thus, the glasses are both mechanically and optically adapted to the image-generating device and to the frame of the HMD device according to the invention.

In a preferred embodiment of the HMD device according to the invention, the connecting device is provided such that the glasses are releasably engaged in the frame when the glasses are connected with the frame. As is evident to the person skilled in the art, such releasable engagement may be realized in the most diverse ways and also results in the advantage that the glasses are always oriented in the same position relative to the frame in the engaged condition.

The connecting device may comprise a first connecting module fixed to the frame and a second connecting module fixed to the glasses, both of said connecting modules being releasably connectable with each other. If different glasses (each respectively correcting different eye deficiencies and lacking temples) each have a second, equal connecting module fixed to them, the glasses for the respective user are very easily connectable with the frame. It is merely required to connect the respective second connecting module of the respective glasses with the first connecting module.

The second connecting module may be mounted, in particular, on a frame holding at least one spectacle lens of the glasses. This results in the advantage that the spectacle lens may be mounted in the frame in a suitable, conventional manner. The second connecting module is then fixed to the frame. Furthermore, the spectacle lens in the frame may be advantageously exchanged (for example, by an optician) when a change in the eye deficiency occurs, so that the HMD device is then optimally adapted again to the user and his eye deficiency.

Of course, the second connecting module may also be fixed to the spectacle lens itself.

In particular, both connecting modules may be provided such that they engage in a form-locking manner when the glasses are connected with the frame. This allows a very stable connection to be realized by which the desired position of the glasses may be retained during use of the HMD device.

Advantageously, at least one of the connecting modules may contain a permanent magnet. This allows the desired releasable connection to be easily realized, with the retaining force of the permanent magnet being selected so as to result in secure retention of the glasses and, at the same time, easy releasability of said connection.

The HMD device according to the invention may be provided such that the observer wearing it on his head can only perceive the images (in particular, virtual images) generated by the HMD device. Alternatively, it may also be provided such that he will perceive the generated images as superimposed upon the environment or that he will perceive the generated images in one part of his visual range and the environment in another. This is also often referred to as augmented representation. Further, the HMD device may be provided such that it either generates images for only one or for both of the observer's eyes, it being possible, in the latter case, to achieve a three-dimensional representation, in particular, by a slight difference between the images for the right eye and for the left eye.

The image-generating device preferably comprises an image-generating module for generating the desired images, which image-generating module may be a luminous display (for example, a background-lit LCD or an LED) or a non-luminous display. In the latter case, the image-generating module may comprise a (preferably planar) light modulator (for example, an LCD module, an LCoS module or a tilting mirror matrix comprising a plurality of independently controllable tilting mirrors), which is illuminated and suitably controlled as a function of predetermined image data, such that it selectively emits light in order to generate the desired image.

DESCRIPTION OF THE FIGURES

The invention is explained in more detail below, essentially by way of example, with reference to the drawings, wherein.

DETAILED DESCRIPTION OF THE PREFERRED EMBODIMENTS

Figure 1:
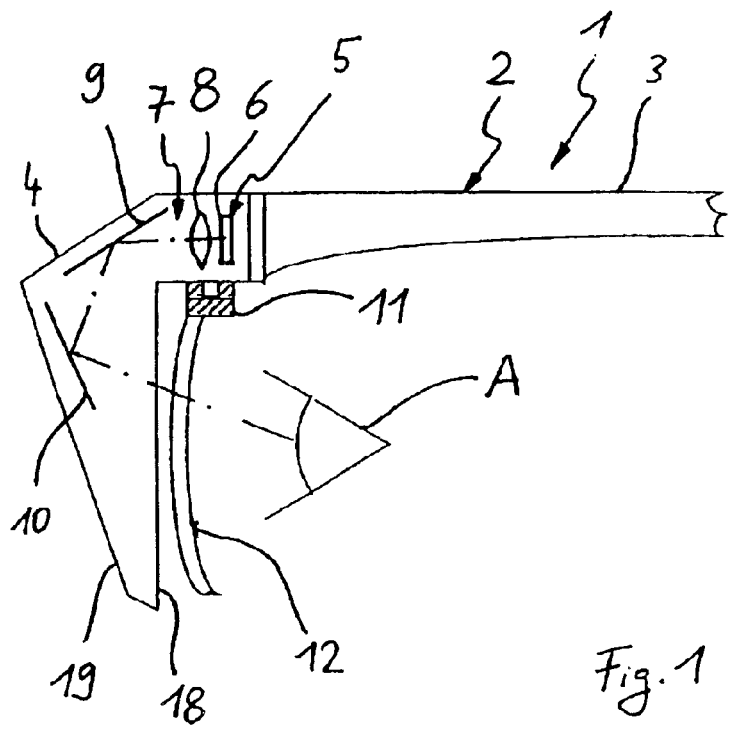
FIG. 1 shows a schematic lateral view of the HMD device according to the invention.

As is evident from FIG. 1, the HMD device 1 comprises a frame 2 having temples 3 (only one of which is visible in FIG. 1 due to the lateral view) and a front part 4 connected therewith.

An image-generating device 5, which comprises an image-generating module 6 for generating said images as well as projection optics 7 for imaging the generated images into the eye A of a user, is arranged in the front part 4. In the presently described embodiment example, the projection optics 7 contain a lens 8 arranged following the image-generating module 6 as well as two deflecting mirrors 9 and 10 arranged following said lens 8.

Further, a connecting device 11 is provided which serves to releasably connect glasses 12, having no temples, with the frame 2.

In the embodiment example described herein, the glasses 12 comprise two framed spectacle lenses, which are connected with each other by a bridge (not shown). Said spectacle glasses serve to correct the eye deficiency of the user of the HMD device.

When the user puts on the HMD device of FIG. 1, or wears it on his head, the sides 3 of the frame are supported by the ears and the bridge of the glasses 2 is supported by the nose, so that the HMD device is worn like ordinary glasses.

Figure 2:
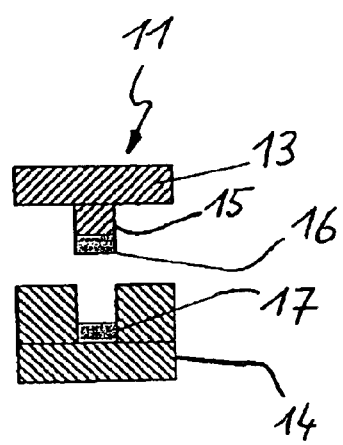
FIG. 2 shows an enlarged view of the connecting device of FIG. 1.

FIG. 2 shows the connecting device separately, in an enlarged view. The connecting device 11 comprises a first connecting module 13 having a T-shaped cross-section and a second connecting module 14 having a U-shaped cross-section.

The first connecting module comprises a first permanent magnet 16 at the end of the central web 15 which faces the second connecting module 14. A second permanent magnet 17 is provided in the recess at the bottom of the U-shaped cross-section of the second connecting module 14, wherein the central web 15 is cylindrical.

The first connecting module 13 is mounted on the frame 2, while the second connecting module 14 is mounted on the glasses 12, in particular on the frame, so that the glasses 12, as viewed in FIG. 1, may be slid from the bottom to the top with the second connecting module 14 onto the first connecting module 13. In the condition shown in FIG. 1, the permanent magnets 16 and 17 then attract each other so as to hold the glasses 12.

During operation, the desired images are generated, on the basis of predetermined image data, by the image-generating module 6 under the control of a control unit (not shown), which may also be arranged in the front part 4, and are projected into the eye (preferably as enlarged virtual images) by the projection optics 7. As is evident from the view shown in FIG. 1 (with the schematically indicated eye A of the user), the observer perceives the generated images through the glasses 12, which are adjusted for him, thus achieving excellent image representation.

In particular, the cylindrical central web 15 may be provided so as to taper (not shown) in the direction toward the first permanent magnet 16. The U-shaped recess in the second connecting module 14 is correspondingly designed to taper toward the second permanent magnet (not shown), so that self-centering and adjusting guidance is achieved when fitting the second connecting module 14 onto the first connecting module 13.

Of course, other types of releasable connections may also be used instead of those described. Thus, the releasable connection of the connecting device 11 may be provided, in particular, for releasable engagement.

The HMD device 1 described herein may be provided either for one eye A or for both eyes of the user. If it is provided for both eyes, either the same images, or slightly different images may be imaged into both eyes in order to create three-dimensional effects.

As is evident from FIG. 1, the HMD device 1 is provided such that the glasses 12, when connected with the frame 2, are arranged following the projection optics 7 or between the projection optics 7 and the eye A, respectively. Thus, the projection optics 7 may be provided in a completely closed manner and need not be changed when the HMD device 1 is adapted to another user. Such adaptation is possible by replacing the glasses 12 with other glasses.

The HMD device 1 shown in FIG. 1 may be modified such that the environment is also perceivable, at least partially. In this case, not only the inner surface 18 of the front part 4, but also the outer surface 19 is transparent, at least in some places. In particular, in this case, the second deflecting mirror 10 may be replaced by a beam splitter.

Although the description above contains many specificities, these should not be construed as limiting the scope of the invention but as merely providing illustrations of some of the presently preferred embodiments of the invention. Thus, the scope of the invention should be determined by the appended claims and their legal equivalents, rather than by the examples given.

What is claimed is:

1. An HMD device comprising a frame, which is mountable on the head of a user, an image-generating device mounted on said frame and comprising projection optics, a connecting device and glasses for correcting an eye deficiency of the user, said glasses lacking temples and said glasses being releasably connectable with said frame by said connecting device, said glasses being arranged following said projection optics when the glasses are connected with the frame.

2. The HMD device as claimed in claim 1, comprising a connecting device that always retains the glasses in the same predetermined position when the glasses are connected with the frame.

3. The HMD device as claimed in claim 1, wherein the connecting device is structured such that the glasses are releasably engaged in the frame when the glasses are connected with the frame.

4. The HMD device as claimed in claim 1, wherein the connecting device comprises a first connecting module fixed to the frame and a second connecting module fixed to the glasses, both of said connecting modules being releasably connectable with each other.

5. The HMD device as claimed in claim 4, wherein the glasses comprise at least one spectacle lens held in a fitting and the second connecting module is mounted on said fitting.

6. The HMD device as claimed in claim 5, wherein both connecting modules are provided such that they engage in a form-locking manner when the glasses are connected with the frame.

7. The HMD device as claimed in claim 6, wherein at least one of the connecting modules contains a permanent magnet.

8. The HMD device as claimed in claim 5, wherein at least one of the connecting modules contains a permanent magnet.

9. The HMD device as claimed in claim 4, wherein both connecting modules are provided such that they engage in a form-locking manner when the glasses are connected with the frame.

10. The HMD device as claimed in claim 9, wherein at least one of the connecting modules contains a permanent magnet.

11. The HMD device as claimed in claim 4, wherein at least one of the connecting modules contains a permanent magnet.

12. A method of correcting for refractive errors of users of an HMD device, the HMD device being mountable on a user's head by a frame comprising a frame front and temples, the frame front resting on the user's face and the temples resting on the user's ears and the HMD device comprising projection optics, the method comprising the steps of:

mounting lenses to compensate for the user's refractive error in a lens supporting structure; and releasably mounting the supporting structure to the HMD device between the user's eyes and the projection optics.

13. The method as claimed in claim 12, further comprising the step of releasably mounting the supporting structure in a repeatable predetermined position.

14. The method as claimed in claim 12, further comprising the steps of securing a first connecting module to the HMD;

securing a second connecting module to the supporting structure; and interconnecting the first connecting module to the second connecting module.

15. The method as claimed in claim 14, further comprising the steps of incorporating a permanent magnet into at least one of the first and second connecting modules.

16. A head mounted display device comprising:

a frame front supporting projection optics adapted to present visual images to at least one of a user's eyes, the frame front being structured to rest on a user's face;

temples operably connected to the frame front and structured to rest on a user's ears;

at least one corrective lens adapted to compensate for the user's visual deficiency, the corrective lens being supported by a connection member releasably connectable to the frame front to interpose the lens between the user's eye and the projection optics in repeatably positionable fashion whereby the lens allows a clear view of the presented visual images.

17. The head mounted display device as claimed in claim 16, in which the connection member comprises a first connecting module attached to the lens and a second connecting module connected to the frame front, the first connecting module being structured to complementarily mate with the second connecting module.

18. The head mounted display device as claimed in claim 17, in which the first connecting module engages the second connecting module in a form locking manner.

19. The head mounted display device as claimed in claim 17, in which at least one of the first connecting module and the second connecting module comprises a permanent magnet.

* * * * *